(No Model.)
J. SHEPHERD.
REVOLVING HARROW.
No. 432,286. Patented July 15, 1890.
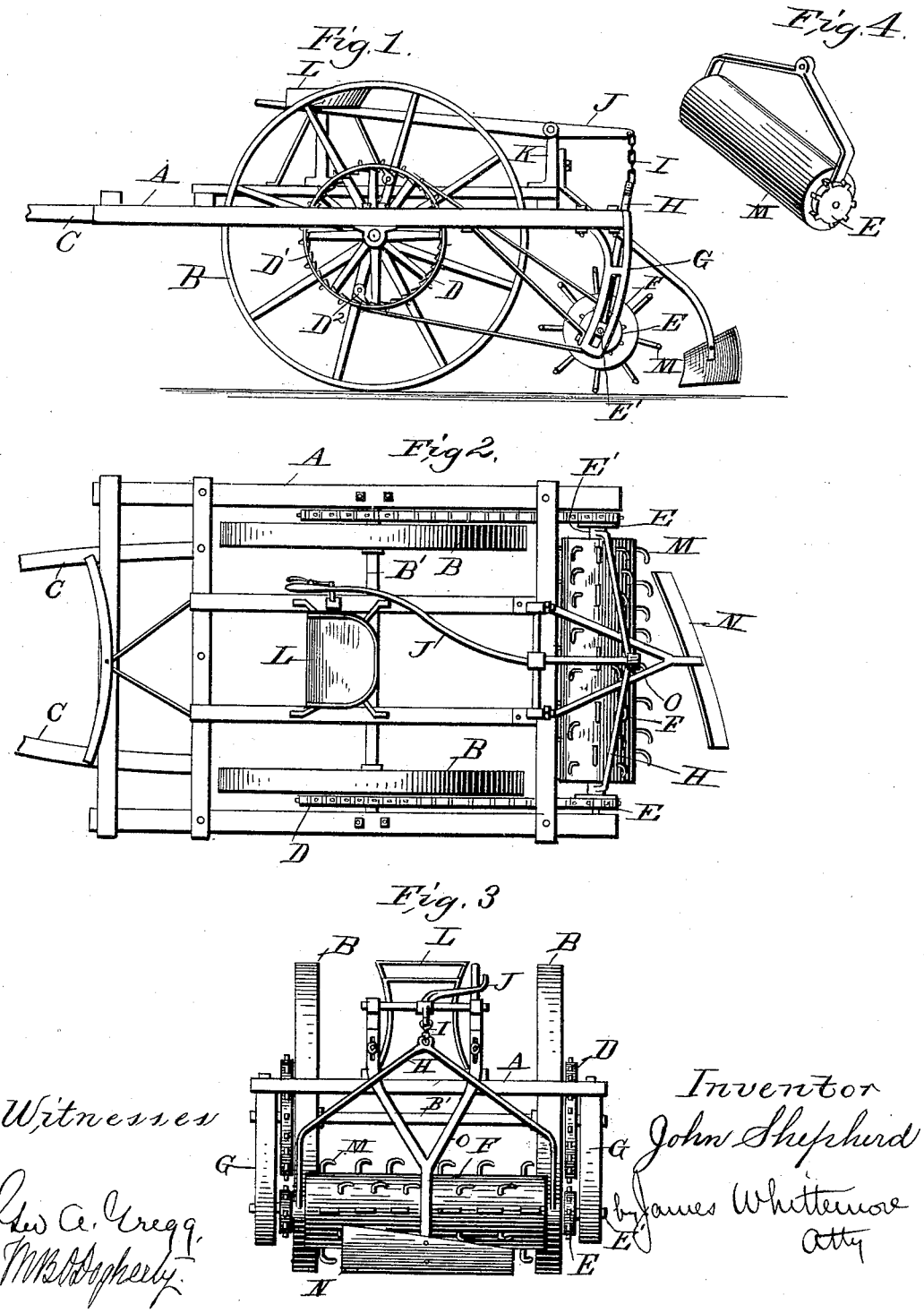
Witnesses
Geo. A. Gregg.
M. B. O'Dogherty.
Inventor
John Shepherd
by James Whittemore
atty

UNITED STATES PATENT OFFICE.

JOHN SHEPHERD, OF MEMPHIS, MICHIGAN.

REVOLVING HARROW.

SPECIFICATION forming part of Letters Patent No. 432,286, dated July 15, 1890.

Application filed January 13, 1890. Serial No. 336,816. (No model.)

*To all whom it may concern:*

Be it known that I, JOHN SHEPHERD, a citizen of the United States, residing at Memphis, in the county of Macomb and State of Michigan, have invented certain new and useful Improvements in Revolving Harrows, &c., of which the following is a specification, reference being had therein to the acompanying drawings.

My invention relates to new and useful improvements in agricultural implements designed to be used for harrowing, rolling, cultivating, &c.; and the invention consists in the peculiar construction of a rotating roller journaled in bearings in rear of the frame and having a vertical motion in said bearing; and, further, in the peculiar construction, arrangement, and combination of the various parts, all as more fully hereinafter described.

In the drawings, Figure 1 is a side elevation of my improved machine. Fig. 2 is a plan view thereof. Fig. 3 is a rear elevation of my improved machine. Fig. 4 is a detached perspective view of the roller.

A is the frame, which is supported upon the ground-wheels B. This frame is provided with any suitable draft attachments, such as the shaft C. The ground-wheels B are journaled within the frame upon the axle B'.

D are sprocket-wheels loosely secured upon the shaft B' within the frame and connected by a suitable sprocket-chain to the sprocket-pinions E upon the shaft E' of the roller F.

D' is a ratchet, preferably formed on the sprocket-wheels D, and D² are pawls secured to the ground-wheels and engaging with said ratchet. The ends of this shaft E' engage in the segmental circular guide-bearings G, which at their upper ends are secured to the rear end with the frame in any suitable manner.

H is a yoke connected at its ends to the shaft E' and centrally supported by the chain I, which is connected to the rear end of the hand-lever J, pivoted upon the bracket K of the frame and extended at its forward end in proximity to the driver's seat L, suitable adjustable locking devices being provided to hold the lever in any adjusted position.

The roller F, when the device is desired to be used for harrowing, is provided with a series of teeth M, which are preferably curved at their outer ends, so as to effect a grading motion in the surface of the ground.

The parts being thus constructed, power being applied to the machine, it is evident that as the machine moves forward the ground-wheels will transmit motion through the pawl and ratchet D² and D' to the shaft B' and the sprocket-wheels D, and motion will be communicated through the sprocket-chain to the pinion E and the roller F, which pulverizes the ground in a most efficient manner. If it is desired to roll the ground, instead of using the machine as a harrow I insert in the place of the harrow-roller F the plain roller M, which will roll the ground in a most thorough manner, the rapid revolution of the roller giving the same efficiency that the weight does in rollers of previous construction.

If it is desired to use my machine for cultivating purposes, I arrange behind the scraper-blade N, which is adjustably supported on the frame of the machine in any suitable manner by means of the bifurcated hangers O.

When it is desired to use the machine as a cultivator, the rollers are made of slightly-smaller size than when it is to be used as a harrow or roller.

The scraper N is detachable, and is not intended to be used except in case of cultivating.

It will be seen that all my parts are within the frame, which allows of making the harrow work outside of the ground-wheels.

What I claim as my invention is—

In a rotary harrow, the combination, with the frame and supporting wheels, of a sprocket-wheel loosely secured on the axle having a ratchet formed thereon, pawls secured on the spokes of the ground-wheels and engaging with said ratchet, curved guides secured to and extending from the rear of the frame having curved slots therein, a revolving harrow mounted on a shaft journaled in sliding bearings in said guides, a yoke connected to said shaft, a lever pivoted to a standard K for adjusting said harrow, a vertically-adjustable Y-shaped piece secured to the standards K and having a drag-blade secured to its lower end, and means for rotating the harrow, substantially as described.

In testimony whereof I affix my signature, in presence of two witnesses, this 2d day of December, 1889.

JOHN SHEPHERD.

Witnesses:
M. B. O'DOGHERTY,
GEO. C. GREGG.